March 17, 1953     M. P. MATUSZAK     2,632,031
PRODUCTION OF ISOOCTANES FROM CYCLOPROPANE AND ISOBUTANE
Filed Nov. 29, 1948
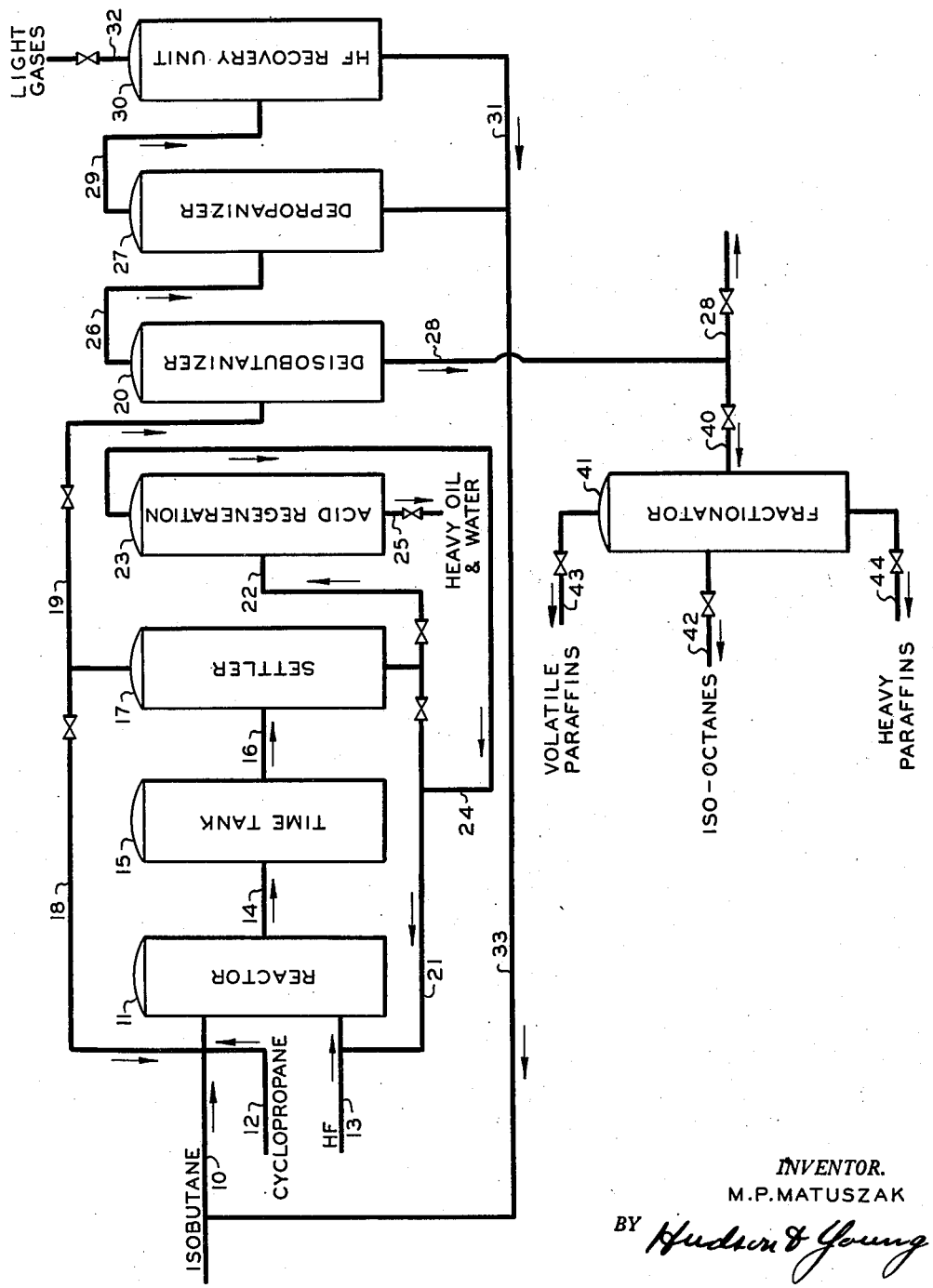
INVENTOR.
M.P.MATUSZAK
BY Hudson & Young
ATTORNEYS Patented Mar. 17, 1953

2,632,031

UNITED STATES PATENT OFFICE 2,632,031

PRODUCTION OF ISOOCTANES FROM CYCLOPROPANE AND ISOBUTANE

Maryan P. Matuszak, Bartlesville, Okla., assignor to Phillips Petroleum Company, a corporation of Delaware Application November 29, 1948, Serial No. 62,434

4 Claims. (Cl. 260—683.4)

This invention relates to the production of highly-branched paraffin hydrocarbons boiling in the motor fuel range. This application is a continuation-in-part of my pending application, Serial No. 635,764, filed December 18, 1945, which is a continuation-in-part of U. S. Patent 2,399,368, issued April 30, 1946, on application Serial No. 467,872, filed December 4, 1942.

It is well known in the art, at this time, to react low boiling paraffins and olefins by what are known as alkylation reactions to form higher boiling paraffin hydrocarbons. Although the mechanism of such reaction is not clearly known or understood, it appears that such reactions primarily involve a juncture between olefin and paraffin to form paraffins having a number of carbon atoms per molecule which represents the sum of the carbon atoms per molecule of the paraffin and the olefin reactants. Thus, isooctanes are obtained by reacting butenes and a butane or by reacting propylene and a pentane, and isononanes are obtained by reacting a butene and a pentane. Such reactions can be carried out at elevated temperatures and pressures in the absence of catalysts or may be carried out in the presence of catalysts at temperatures from below atmospheric temperature to temperatures approaching and overlapping those employed in noncatalytic processes. It appears that the temperature reaction conditions should be such that the paraffin will undergo only a very slow decomposition by itself and the olefin will tend to undergo a polymerization reaction with itself. The alkylation will be promoted by maintaining high paraffin-olefin ratio. Among the catalysts which are suitable for promoting such alkylation reactions can be included synthetic silica-alumina type catalysts, so-called solid phosphoric acid catalysts, liquid phosphoric acid, hydrofluoric acid, sodium chloro-aluminate and similar compounds with other halogens and/or with other alkali metals, aluminum chloride, aluminum bromide, zinc chloride, zinc bromide, chloro-sulphonic acid, sulfuric acid, etc.

I have now found that under certain reaction conditions, cyclopropane reacts with isobutane under the influence of hydrofluoric acid, or of sulfuric acid, to yield a product in which 2,2,4-trimethylpentane is present in conspicuously large proportion. I have found that cyclopropane is not coextensively equivalent to propylene, and the reactions that occur in the reaction mixture comprising isoparaffin, cyclopropane, and acid-type catalyst are at present incompletely understood. It appears, however, that cyclopropane is substantially unique among cycloparaffins in its ability to effect or to participate in reactions that result in formation, from a low-boiling isoparaffin, of higher-boiling paraffins having twice the number of carbon atoms per molecule that is characteristic of the original isoparaffin. This is a surprising and unexpected result, inasmuch as, for example, isobutane is caused to yield a high proportion of octanes, whereas the aggregate number of carbon atoms in isobutane and cyclopropane suggests only the formation of heptanes. The uniqueness of cyclopropane among cycloparaffins possibly may be attributable to the fact that it is the lightest member of the cycloparaffin series and may have inherently within itself internal strains that facilitate rupture of the ring. In line with this consideration, a possible theoretical explanation of the formation of such an octane as 2,2,4-trimethylpentane may be that under the influence of the catalyst the cyclopropane ring is ruptured; the resulting chain acquires hydrogen by hydrogen transfer from isobutane, thereby causing the formation of isobutylene or an equivalent transitory species; and this isobutane-derived species reacts with more isobutane to form 2,2,4-trimethylpentane. Other octanes may be formed similarly or indirectly from 2,2,4-trimethylpentane or a transitory precursor thereof by isomerization or rearrangement under the influence of the catalyst.

One object of this invention is to produce isoparaffin hydrocarbons boiling in the motor fuel range from lower-boiling isoparaffins.

Another object of my invention is to produce isooctanes from isobutane.

Other objects and advantages of my invention will become apparent, to one skilled in the art, from the accompanying disclosure and discussion.

Understanding of a preferred embodiment of the invention may be facilitated by the accompanying drawing, which is a schematic flow diagram exemplifying a suitable arrangement of equipment for practicing this embodiment in a continuous manner.

Isobutane, which is a preferred low-boiling isoparaffin, is introduced through inlet 10 into reactor 11. Cyclopropane is simultaneously introduced through inlet 12. The resulting mixture is caused to react by the catalytic influence of substantially anhydrous hydrofluoric acid, which is introduced through inlet 13. The reaction conditions in reactor 11 can vary considerably but are typically approximately as follows. The temperature is approximately 100 to 200° F., preferably 100 to 150° F. The pressure should be sufficient to maintain the reaction mixture in liquid phase; a pressure of the order of 100 to 200 p. s. i. is generally sufficient. The volume ratio of catalyst to hydrocarbons is preferably approximately 1:1, but it can be between about 0.3:1 to 2:1. The mol ratio of isobutane to cyclopropane in the aggregate feed should be as high as can be obtained economically; under most conditions, a mol ratio of approximately 10:1 is preferred, The time of reaction can vary considerably, but it should generally be somewhat longer than in the catalytic alkylation of isobutane with an olefin like propylene; usually, an average reaction time of 20 to 100 minutes is sufficient, depending on the other reaction conditions. Because of this relatively long reaction time, it is advantageous to have the reaction mixture reside in reactor 11, wherein very intimate contacting between the hydrocarbon and catalyst phases is effected by vigorous mixing by mechanical means, for a fraction, such as approximately one-third to one-half, of this time; then the reaction mixture is passed, as by conduit 14, to time tank 15, wherein less vigorous mixing is appropriate. If desired, time tank 15 may be a continuation or extension of reactor 11. If desired, concentrated sulfuric acid may be used as the catalyst. However, since the production of isooctanes from isobutane and cyclopropane is greatest at higher-than-usual reaction temperatures, and sulfuric acid also acts extensively as an oxidizing reactant at these temperatures, its use is less desirable than the use of hydrofluoric acid.

After the reaction is substantially completed, the reaction mixture is passed by conduit 16 to settler 17, wherein it is separated into two liquid layers. Part of the upper, hydrocarbon layer can be recycled to reactor 11, as by conduit 18, but generally substantially all of it is passed through conduit 19 to deisobutanizer 20. The major part of the lower, hydrofluoric acid layer is recycled through conduit 21 to reactor 11; usually, however, a minor part is passed through conduit 22 to acid regeneration unit 23, for purification. In acid regeneration unit 23, hydrofluoric acid, accompanied by some isobutane and some low-boiling organic fluorine compounds, is fractionally distilled overhead, and it is recycled to reactor 11 by conduit 24; impurities from which the hydrofluoric acid is thus separated, including heavy oil formed by high temperature decomposition and some water, are removed through outlet 25.

In deisobutanizer 20, the hydrocarbon layer is fractionally distilled to free it from unreacted isobutane, light gases such as propane, propyl fluorides, and dissolved hydrofluoric acid, which are passed overhead and through conduit 26 to depropanizer 27. The resulting kettle product, which comprises higher-boiling paraffins formed by reaction of isobutane and cyclopropane, is withdrawn through outlet 28 and is passed to storage or to subsequent fractionation, or other processing steps. If desired, this fraction can be passed through line 40 to fractionator 41, with recovery of an iso-octane fraction through line 42, and of a lower-boiling, volatile paraffinic fraction through line 43 and a heavier paraffin fraction through line 44.

Depropanizer 27 effects separation by fractional distillation between a kettle fraction comprising isobutane and any unreacted cyclopropane and an overhead fraction comprising light gases, principally propane. The kettle fraction, which at times may contain some hydrofluoric acid, is recycled to reactor 11, as by conduit 33. The overhead fraction, which usually contains the major part of the hydrofluoric acid carried to depropanizer 27, is passed by conduit 29 to hydrofluoric acid-recovery unit 30, wherein the hydrofluoric acid is recovered by any suitable operation; the recovered hydrofluoric acid is recycled to reactor 11, as by conduit 31. Light gases are removed through outlet 32.

The product recovered through outlet 28 boils principally in the aviation-gasoline range, has a high proportion of 2,2,4-trimethylpentane, and is of excellent antiknock rating.

The following example illustrates advantages of this invention. The reactants, their proportions and other conditions of the reaction, are presented as being typical, and should not be construed to limit the invention unduly.

A batch-type run for reacting isobutane and cyclopropane in the presence of anhydrous hydrofluoric acid was made in an 18-liter reactor having a 1725 R. P. M. paddle-type stirrer. Into the reactor were charged 6.6 pounds of hydrofluoric acid and 14.74 pounds of isobutane. The mixture was stirred and 1.10 pound of cyclopropane was added during 18 minutes; the over-all mol ratio of isobutane to cyclopropane was 9.7:1. The stirring of the mixture was then continued for 42 additional minutes. Because of the heat of reaction, the temperature increased from approximately 100° F. to approximately 113° F.; the pressure was 102 to 122 p. s. i. When the stirring was stopped 60 minutes after the start of the addition of cyclopropane, the reaction mixture was allowed to settle, and the acid layer was withdrawn. This acid layer was 93.4 weight per cent hydrofluoric acid. When 0.46 pound of this acid layer was added to water, 1.8 grams of dissolved gas was liberated; this gas contained 0.337 weight per cent of organic fluorine. The hydrocarbon layer obtained from the reaction mixture was water-washed to free it from dissolved hydrofluoric acid; it was then dried and was debutanized in a vacuum-jacketed glass column. The resulting overhead fraction contained 0.237 weight per cent of organic fluorine, and the resulting kettle product contained 0.0066 weight per cent of organic fluorine. The yield of recovered debutanized product was 2.282 pounds or 208 weight per cent of the cyclopropane. Some of the cyclopropane appeared not to have reacted, and some had apparently formed propyl fluorides, so that in an operation in which recycling of these materials to the reactor is practiced the yield is considerably enhanced; this is indicated by the following composition of the hydrocarbon layer before debutanization, in weight per cent: cyclopropane, 2.5; isopropyl fluoride, 0.3; isobutane, 79.5; n-propyl fluoride, 0.02; n-butane, 3.4; heavier, 14.3. The product, when debutanized to 59° F. and fractionally distilled, provided the following fractions and characterization data:

| Fraction | Boiling Range, ° F. | Vol. Percent | Sp. Gr. (20 G) | Ref. Ind. | Br. No. |
|---|---|---|---|---|---|
| 1 | 59–72 | 6.2 | | | |
| 2 | 72–111 | 2.8 | | | |
| 3 | 111–170 | 4.2 | 0.6654 | 1.3760 | 0.29 |
| 4 | 170–178 | 6.2 | 0.6740 | 1.3811 | 0.07 |
| 5 | 178–190 | 7.0 | 0.6838 | 1.3842 | 0.11 |
| 6 | 190–196 | 7.5 | 0.6934 | 1.3901 | 0.11 |
| 7 | 196–203 | 5.7 | 0.6934 | 1.3911 | 0.11 |
| 8 | 203–216 | 34.8 | 0.6924 | 1.3910 | 0.04 |
| 9 | 216–257 | 19.8 | 0.7166 | 1.4022 | 0.10 |
| 10 | >257 | 5.8 | 0.7492 | 1.4185 | 0.29 |
| | | 100.0 | | | |

It may be noted that the octane fractions (No. 8–9) amounted to 54.6 volume per cent and that by far the largest part of the octanes was 2,2,4-trimethylpentane, which has a boiling point of approximately 211° F. In strong contrast, the heptane fractions (No. 4–7) amounted to only 26.4 volume per cent. All fractions, as shown by the very low values for bromine number, were substantially completely saturated. The motor fuel properties of the debutanized product were as follows:

ASTM distillation, °F.:
| | |
|---|---|
| First drop | 91 |
| 10 vol. per cent evap. | 122 |
| 20 | 169 |
| 30 | 193 |
| 40 | 201 |
| 50 | 206 |
| 60 | 209 |
| 70 | 213 |
| 80 | 221 |
| 90 | 237 |
| 95 | 265 |
| End point | 374 |
| Rec., per cent | 92.0 |
| Res., per cent | 1.5 |
| Loss, per cent | 6.5 |
| Reid vapor pressure, lb. | 10.80 |
| ASTM octane number | 92.2 |

It may be noted that the presence of isooctanes, particularly 2,2,4-trimethylpentane, was reflected by the excellent octane rating.

A comparative run was made, in a steel batch-type stirrer-equipped reactor, for reacting isobutane and propylene in the presence of anhydrous hydrofluoric acid at about 110° F. The run was made under what may be termed ordinary alkylating conditions; that is, the propylene was added as a vapor directly to a well-agitated two-liquid-phase mixture of approximately one volume of hydrofluoric acid and three volumes of isobutane, or an approximately ninefold molecular excess of isobutane. The reaction was stopped by stopping the stirring and by letting the reaction mixture separate into two liquid layers when the propylene had been in the reactor for 11.5 to 16.0 minutes; thus the calculated average reaction time was about 13.8 minutes. The quantitative proportions of the individual paraffins so produced is shown by the following data:

*Composition of product, volume per cent*

| | |
|---|---|
| Pentanes | 1.7 |
| Hexanes | 5.3 |
| Heptanes | 62.0 |
| Octanes (mainly isooctane) | 19.5 |
| Nonanes+decanes | 8.1 |
| Heavier | 3.4 |
| | 100.0 |

As will be evident to those skilled in the art, various modifications of this invention can be made, or followed, in the light of the foregoing disclosure and discussion, without departing from the spirit or scope of the invention or from the scope of the claims.

I claim:

1. An improved process of producing isooctanes, which comprises intimately admixing liquid hydrofluoric acid catalyst and isobutane and cyclopropane, with at least two molecular equivalents of isobutane for each molecular equivalent of cyclopropane, under reaction conditions between 100 and 200° F. and a pressure sufficient to maintain liquid phase and with a volume ratio of liquid hydrofluoric acid to hydrocarbons between 0.3:1 and 2:1 for a time between 20 to 100 minutes, and recovering from resulting reaction products a hydrocarbon fraction comprising isooctanes as a product of the process.

2. An improved process of converting isobutane to isooctanes, which comprises passing to a reaction zone isobutane, cyclopropane, and a hydrofluoric acid catalyst in amounts such that more than two molecular equivalents of isobutane for each molecular equivalent cyclopropane are passed to said reaction zone and such that the ratio of hydrofluoric acid to hydrocarbons in said reaction zone, in liquid volumes, is between 0.3:1 and 2:1, intimately admixing, and maintaining said materials in said reaction zone at a temperature between 100 and 200° F. for a time between 20 and 100 minutes and under a pressure sufficient to maintain liquid phase, passing effluents of said reaction zone to separating means, and recovering a fraction comprising isooctanes as a product of the process.

3. An improved process for converting isobutane to isooctanes, which comprises passing to a reaction zone isobutane, cyclopropane, and a liquid acid catalyst of the class consisting of liquid hydrofluoric acid and sulfuric acid in amounts such that more than two molecular equivalents of isobutane for each molecular equivalent of cyclopropane are passed to said reaction zone and such that the ratio of said acid catalyst to hydrocarbons in said reaction zone, in liquid volumes, is between 0.3:1 and 2:1, intimately admixing, and maintaining said materials in said reaction zone at a temperature between 100 and 200° F. for a time between 20 and 100 minutes and under a pressure sufficient to maintain liquid phase, passing effluents of said reaction zone to separating means, and recovering a fraction comprising isooctanes as a product of the process.

4. A process for converting isobutane to isooctanes, which comprises intimately admixing in a first reaction zone isobutane, cyclopropane and liquid concentrated hydrofluoric acid at a reaction temperature between 100 and 200° F. for a first period between one-third and one-half of a total reaction time between 20 and 100 minutes, with a mol ratio of isobutane to cyclopropane in the aggregate feed of approximately 10:1 and volume ratio of catalyst to hydrocarbon between 0.3:1 and 2:1 and a pressure sufficient to maintain the reaction mixture in liquid phase, immediately after said first period passing said mixture to a quiescent zone for the remainder of said total reaction time under otherwise the same conditions, passing effluents of said quiescent zone to separating means, and recovering from said separating means an isooctane fraction as a fraction comprising the major portion of the total liquid hydrocarbon products of the process.

MARYAN P. MATUSZAK.

REFERENCES CITED

The following references are of record in the file of this patent:

UNITED STATES PATENTS

| Number | Name | Date |
|---|---|---|
| 2,416,395 | Kuhn | Feb. 25, 1947 |
| 2,423,470 | Simons | July 8, 1947 |
| 2,469,344 | Stover | May 3, 1949 |

FOREIGN PATENTS

| Number | Country | Date |
|---|---|---|
| 830,037 | France | July 19, 1938 |
| 498,260 | Great Britain | Jan. 5, 1939 |